(12) United States Patent
Utsumi et al.

(10) Patent No.: US 12,279,633 B2
(45) Date of Patent: Apr. 22, 2025

(54) STEVIOL GLYCOSIDE COMPOSITION

(71) Applicant: SUNTORY HOLDINGS LIMITED, Osaka (JP)

(72) Inventors: Yui Utsumi, Kanagawa (JP); Keisuke Takayanagi, Kanagawa (JP); Tomoyuki Nishibori, Kanagawa (JP); Soichiro Urai, Kanagawa (JP); Ryoki Mitsui, Kanagawa (JP); Yoshiaki Yokoo, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 579 days.

(21) Appl. No.: 17/637,590

(22) PCT Filed: Aug. 28, 2020

(86) PCT No.: PCT/JP2020/032520
§ 371 (c)(1),
(2) Date: Feb. 23, 2022

(87) PCT Pub. No.: WO2021/039944
PCT Pub. Date: Mar. 4, 2021

(65) Prior Publication Data
US 2022/0273003 A1 Sep. 1, 2022

(30) Foreign Application Priority Data

Aug. 28, 2019 (JP) ................................ 2019-156111

(51) Int. Cl.
*A23L 2/60* (2006.01)
*A23L 27/00* (2016.01)

(52) U.S. Cl.
CPC ................. *A23L 2/60* (2013.01); *A23L 27/88* (2016.08)

(58) Field of Classification Search
CPC ................................ A23L 2/60; A23L 27/88
See application file for complete search history.

(56) References Cited

U.S. PATENT DOCUMENTS

| 2013/0071339 A1 | 3/2013 | Markosyan |
| 2016/0021918 A1 | 1/2016 | Brower, III et al. |

(Continued)

FOREIGN PATENT DOCUMENTS

| EP | 2868209 A1 | 5/2015 |
| EP | 3692811 A1 | 8/2020 |

(Continued)

OTHER PUBLICATIONS

Pawar et al. Extractive Production of Microbial Oil Using Hydrophobic Adsorbents. Engineering Reports. vol. 2, Issue 4. 2000.*

(Continued)

*Primary Examiner* — Anthony J Weier
(74) *Attorney, Agent, or Firm* — Greenblum & Bernstein, P.L.C.

(57) ABSTRACT

A steviol glycoside composition having a total content of specific nine types of steviol glycosides is equal to or more than 60% by weight and less than 95% by weight and the total content of other steviol glycosides and *Stevia*-derived components is 5 to 40% by weight each relative to the total solid content weight of composition, weight-based ratios of rebaudioside A and rebaudioside D relative to the total content of the nine steviol glycosides are 35 to 75% and 5 to 30% by weight, respectively, and the composition has at least one of: methanol content is 0.10% by weight or less relative to the total content of the nine steviol glycosides; polyphenol content is 2.0% by weight or less relative to the total content of the nine steviol glycosides; and nitrogen amount is 0.40% by weight or less relative to the total amount of the nine steviol glycosides.

7 Claims, 1 Drawing Sheet

(56) References Cited

U.S. PATENT DOCUMENTS

| | | |
|---|---|---|
| 2016/0128371 A1 | 5/2016 | Purkayashta et al. |
| 2016/0295892 A1 | 10/2016 | Schafer et al. |
| 2017/0275324 A1 | 9/2017 | Prakash et al. |
| 2017/0349620 A1 | 12/2017 | Prakash et al. |
| 2018/0237465 A1 | 8/2018 | Markosyan |
| 2018/0255815 A1 | 9/2018 | Browne et al. |
| 2019/0208803 A1 | 7/2019 | Browne et al. |
| 2021/0068360 A1 | 3/2021 | Brower, III et al. |
| 2021/0345647 A1 | 11/2021 | Browne et al. |

FOREIGN PATENT DOCUMENTS

| | | |
|---|---|---|
| JP | S54-76600 A | 6/1979 |
| JP | S55-39731 A | 3/1980 |
| JP | S60-13662 B2 | 4/1985 |
| JP | S64-25790 A | 1/1989 |
| JP | 2002-45145 A | 2/2002 |
| JP | 2004-344071 A | 12/2004 |
| JP | 2016-515814 A | 6/2016 |
| JP | 2016-537317 A | 12/2016 |
| JP | 2018-535656 A | 12/2018 |
| WO | WO 2014/146084 A1 | 9/2014 |
| WO | WO 2015/062998 A1 | 5/2015 |
| WO | WO 2016/086097 A1 | 6/2016 |
| WO | WO 2016/086108 A1 | 6/2016 |
| WO | WO 2017/035527 A1 | 3/2017 |
| WO | WO 2018/027157 A1 | 2/2018 |
| WO | WO 2018/053135 A | 3/2018 |
| WO | WO 2018/102447 A2 | 6/2018 |

OTHER PUBLICATIONS

Office Action for JP App. No. 2021-543024, dated Feb. 6, 2024 (w/ translation).
EESR for EP App. No. 20859385.5, dated Aug. 14, 2023.
Wallin, "Steviol Glycosides—Chemical and Technical Assessment", Chemical and Technical Assessment 63$^{rd}$ JECFA, Jan. 1, 2004, pp. 1-5, XP055185337, Retrieved from the Internet: URL: ftp://ftp.fao.org/es/esn/jecfa/cta/CTA_63_Steviol_.pdf [retrieved on Apr. 23, 2015].
ISR for PCT/JP2020/032520, dated Oct. 27, 2020.
Stevia Sweetener Purification, "Food & Beverage—Application—ION Exchange Resins", Mitsubishi Chemical, 17 pp. (2018).
De Oliveira et al., "Chitosan as Flocculant Agent for Clarification of Stevia Extract", Polimeros, 22(4):401-406 (2012).
Kootstra et al., "Extraction of steviol glycosides from fresh Stevia using acidified water; comparison to hot water extraction, including purification", ACRRES, Jan. 2017, pp. 1-26.
Office Action for CN App. No. 202080060132.7 dated Oct. 28, 2023 (w/ translation).

\* cited by examiner

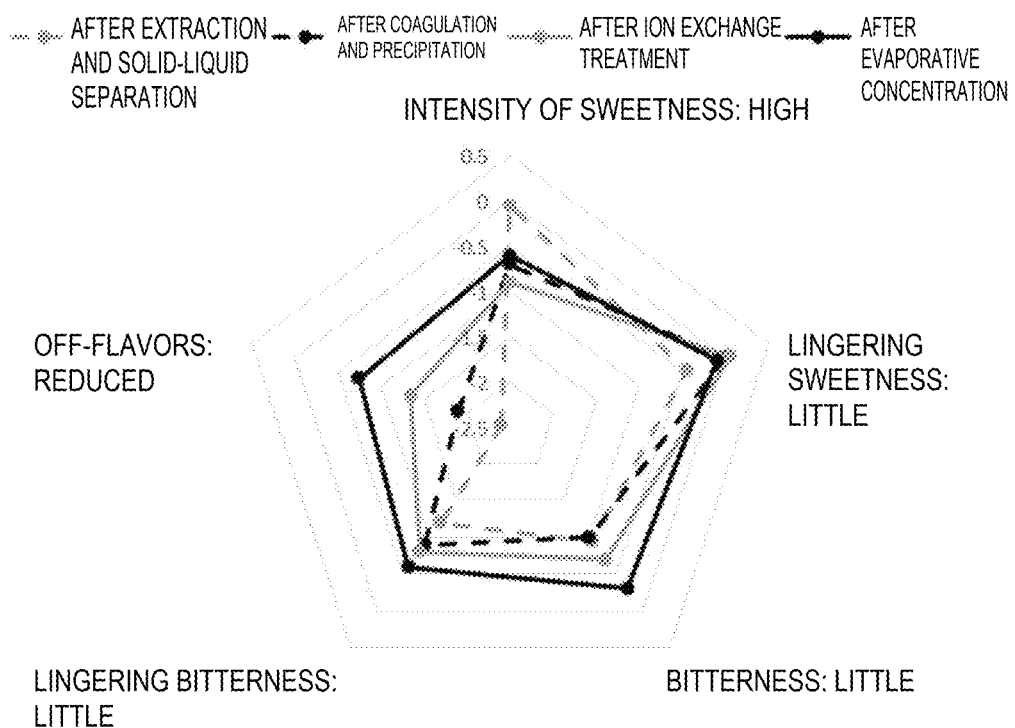

STEVIOL GLYCOSIDE COMPOSITION

TECHNICAL FIELD

The present invention relates to a steviol glycoside composition and a method for producing the steviol glycoside composition from a dry leaf of *Stevia* plant. The present invention also relates to a food or drink containing a novel steviol glycoside.

BACKGROUND ART

Leaves of *Stevia rebaudiana* contain a secondary metabolite called steviol, which is one of the diterpenoids. Steviol glycoside has sweetness 300 times as much as sugar, and thus is used as a calorie-free sweetener in the food industry. Obesity has been spread worldwide as a serious social problem, and demand for calorie-free sweeteners is increasing these days also from the viewpoint of good health and reduction of health care cost. While, at present, aspartame, which is an artificially synthesized amino acid derivative, and acesulfame potassium are used as an artificial sweetener, calorie-free, naturally occurring sweeteners such as steviol glycoside are expected to be safer and make it easier to gain public acceptance.

So far various compositions including steviol glycoside have been reported. For example, Patent Literature 1 discloses a method for producing a steviol glycoside composition by extracting from leaves of the *Stevia rebaudiana* Plant Comprising rebaudioside M in an amount above a common relative concentration of rebaudioside M.

CITATION LIST

Patent Literature

[Patent Literature 1] International Publication No. 2017/035527

SUMMARY OF INVENTION

Problem to be Solved by the Invention

In the circumstances described above, at present there is a need for a novel composition of steviol glycoside and a novel method for producing a steviol glycoside composition from a dry leaf of *Stevia* plant.

Means for Solving the Problems

The present invention provides a steviol glycoside composition, a method for producing a steviol glycoside composition from a dry leaf of *Stevia* plant, and a food or drink comprising the steviol glycoside composition and the like as shown below.

A steviol glycoside composition, wherein a total content of 9 steviol glycosides of stevioside, rebaudioside A, rebaudioside B, rebaudioside C, rebaudioside D, rebaudioside F, dulcoside A, rubusoside and steviolbioside is 60 wt % or more and less than 95 wt % based on a total weight of solids of the steviol glycoside composition; and
 a total content of a steviol glycoside other than the 9 steviol glycosides and a component derived from *Stevia* other than steviol glycosides is 5 wt % to 40 wt %;
 a ratio of a content of rebaudioside A to the total content of the 9 steviol glycosides on a weight basis is 35 wt % to 75 wt %, and a ratio of a content of rebaudioside D to the total content of the 9 steviol glycosides on a weight basis is 5 wt % to 30 wt %; and
 wherein the composition has at least one selected from the following properties:
 a content of methanol is 0.10 wt % or less based on an amount of the 9 steviol glycosides in the composition;
 a content of polyphenol is 2.0 wt % or less based on the amount of the 9 steviol glycosides in the composition; and
 a total amount of nitrogen is 0.40 wt % or less based on the amount of the 9 steviol glycosides in the composition.

The steviol glycoside composition according to the above, wherein the steviol glycoside composition is *Stevia* extract.

The steviol glycoside composition according to either of the above, wherein a ratio of rebaudioside B is 0.005 to 3.0 wt %, a ratio of rebaudioside C is 3.0 to 9.0 wt %, a ratio of rebaudioside F is 0.5 to 4.0 wt %, a ratio of dulcoside A is 0.01 to 0.50 wt %, a ratio of rubusoside is 0.01 to 0.50 wt %, a ratio of steviolbioside is 0.001 to 0.50 wt %, and a ratio of stevioside is 1.0 to 35 wt % based on the content of the 9 steviol glycosides.

The steviol glycoside composition according to any of the above, further comprising one or more steviol glycosides selected from the group consisting of rebaudioside E, rebaudioside I, rebaudioside J, rebaudioside K, rebaudioside M, rebaudioside N, rebaudioside O, rebaudioside Q, rebaudioside R, dulcoside C, steviol and steviolmonoside.

The steviol glycoside composition according to any of the above, further comprising 0.5 wt % to 9.0 wt % of rebaudioside M based on the total amount of the 9 steviol glycosides.

A food or drink comprising the steviol glycoside composition according to any of the above.

The food or drink according to the above, wherein the food or drink is a drink.

A method for producing a steviol glycoside composition from a dry leaf of *Stevia* plant, the method comprising
 performing extraction of the dry leaf using a solvent to obtain an extract;
 subjecting the extract to solid-liquid separation treatment to obtain a clear liquid;
 adding a coagulant to the clear liquid to coagulate the liquid to obtain a processed liquid;
 treating the processed liquid with a hydrophobic porous resin; and
 eluting a steviol glycoside from the porous resin using a solvent,
 wherein a total content of 9 steviol glycosides of stevioside, rebaudioside A, rebaudioside B, rebaudioside C, rebaudioside D, rebaudioside F, dulcoside A, rubusoside and steviolbioside is 60 wt % or more and less than 95 wt % based on a total weight of solids of the steviol glycoside composition; and
 a total content of a steviol glycoside other than the 9 steviol glycosides and a component derived from *Stevia* other than steviol glycosides is 5 wt % to 40 wt %.

The method according to the above method, wherein the porous resin has a modal pore size of 10 to 200 Å.

The method according to either of the above methods, wherein the porous resin is a copolymer of styrene and divinylbenzene.

The method according to the above method, wherein an ion exchange group is not introduced to the copolymer of styrene and divinylbenzene.

The method according to any of the above methods, wherein the porous resin comprises one or more hydrophobic groups selected from an aryl group, an alkyl group, an alkylsilyl group, an ester group and an epoxy group.

The method according to any of the above methods, wherein the coagulant comprises one or more selected from aluminum sulfate, polyaluminum chloride, iron (III) chloride or a hydrate thereof, a synthetic polymer coagulant, alginic acid, chitin, chitosan and calcium hydroxide.

A steviol glycoside composition produced by the method according to any of the above methods.

Advantageous Effects of Invention

The present invention can provide a steviol glycoside composition, a method for producing a steviol glycoside composition from a dry leaf of *Stevia* plant and a food and drink containing a steviol glycoside composition. A steviol glycoside composition according to a preferred embodiment of the present invention has an excellent taste. A production method according to another embodiment of the present invention can provide a steviol glycoside composition in which the amount of impurities is reduced.

BRIEF DESCRIPTION OF DRAWINGS

FIG. 1 is a view illustrating the results of sensory evaluation.

DESCRIPTION OF EMBODIMENTS

The present invention will be described in detail below. The following embodiments are examples illustrating the present invention and do not intend to limit the present invention to the embodiments. The present invention may be practiced in various forms as long as the forms do not deviate from the gist of the present invention. All the literatures and the patent literatures including unexamined publications and patent publications cited in the present description are to be included in the present invention by reference. Furthermore, the present description includes the contents disclosed in the description and drawings of Japanese Patent Application No. 2019-156111 filed on Aug. 28, 2019, to which the present application claims priority.

In the present description, "rebaudioside," "Reb" and "Reb." all mean the same, "rebaudioside." Likewise, "dulcoside" means "dulcoside."

1. Steviol Glycoside Composition

In the steviol glycoside composition of the present invention, the total content of 9 steviol glycosides of stevioside, rebaudioside A, rebaudioside B, rebaudioside C, rebaudioside D, rebaudioside F, dulcoside A, rubusoside and steviolbioside is 60 wt % or more and less than 95 wt % based on the total weight of solids of the steviol glycoside composition; and the total content of a steviol glycoside other than the 9 steviol glycosides and a component derived from *Stevia* other than steviol glycosides is 5 wt % to 40 wt %; and the ratio of the content of rebaudioside A to the total content of the 9 steviol glycosides on a weight basis is 35 wt % to 75 wt %, and the ratio of the content of rebaudioside D to the total content of the 9 steviol glycosides on a weight basis is 5 wt % to 30 wt %, respectively. Furthermore, the steviol glycoside composition of the present invention has at least one selected from the following properties:

the content of methanol is 0.10 wt % or less based on the amount of the 9 steviol glycosides in the composition;
the content of polyphenol is 2.0 wt % or less based on the amount of the 9 steviol glycosides in the composition; and
the total amount of nitrogen is 0.40 wt % or less based on the amount of the 9 steviol glycosides in the composition.

The steviol glycoside composition according to an embodiment of the present invention has at least two and preferably all the three properties selected from the above properties regarding the content of methanol, the content of polyphenol and the total amount of nitrogen. The steviol glycoside composition according to an embodiment of the present invention has the above properties regarding the content of methanol and the properties regarding the content of polyphenol; the properties regarding the content of methanol and the properties regarding the total amount of nitrogen; or the properties regarding the content of polyphenol and the properties regarding the total amount of nitrogen.

The steviol glycoside composition according to an embodiment of the present invention tastes sweet and good, and thus can be used as a novel sweetener. Furthermore, since the content of one or more impurities selected from methanol, polyphenol and a nitrogen-containing compound is small in the steviol glycoside composition according to another embodiment of the present invention, the steviol glycoside composition may be used as an intermediate for producing a high purity formulation (purity 95% or more) of rebaudioside A or rebaudioside D. The steviol glycoside composition according to an embodiment of the present invention is a *Stevia* extract. More specifically, the *Stevia* extract is subjected to a predetermined treatment of purification to adjust the amount of steviol glycoside and the amount of impurities contained.

As used herein, the "total weight of solids of the steviol glycoside composition" means the total weight of components excluding solvent such as water, and may be measured by a drying method. More specifically, the total weight may be determined by heating and drying a steviol glycoside composition and measuring its mass by using, for example, Infrared Moisture Analyzer FD-800 (made by Kett Electric Laboratory). The steviol glycoside composition of the present invention includes one or more of 9 steviol glycosides of stevioside, rebaudioside A, rebaudioside B, rebaudioside C, rebaudioside D, rebaudioside F, dulcoside A, rubusoside and steviolbioside, a steviol glycoside other than the 9 steviol glycosides and a component derived from *Stevia* other than steviol glycosides. As long as the steviol glycoside composition includes one or more of the 9 steviol glycosides, the content of some of the steviol glycosides may be 0. The content of the 9 steviol glycosides is 60 wt % or more and less than 95 wt % based on a total weight of solids of the steviol glycoside composition, and the content of a steviol glycoside other than the 9 steviol glycosides and a component derived from *Stevia* other than steviol glycosides is 5 wt % to 40 wt % (or more than 5 wt % and 40 wt % or less). The steviol glycoside composition according to an embodiment of the present invention may include an optional component other than the steviol glycoside and the component derived from *Stevia* other than steviol glycosides. The content of the above 9 steviol glycosides may be measured by a method using LC/MS/MS or HPLC, and it is preferable to measure the content by a HPLC method according to JECFA (2010).

The steviol glycoside composition according to an embodiment of the present invention includes rebaudioside A and rebaudioside D. In an embodiment of the present invention, the content of rebaudioside A is 35 wt % to 75 wt % based on the total content of the 9 steviol glycosides. In another embodiment, the ratio of rebaudioside A to the total content of the 9 steviol glycosides may be 37 wt % to 73 wt %, 39 wt % to 71 wt %, 40 wt % to 70 wt %, 42 wt % to 68 wt %, 44 wt % to 66 wt %, 46 wt % to 64 wt %, 48 wt % to 62 wt %, 50 wt % to 60 wt %, 35 wt % to 65 wt % or 37 wt % to 63 wt %, and is preferably 35 wt % to 70 wt %.

In an embodiment of the present invention, the ratio of rebaudioside D is 5 wt % to 30 wt % based on the total content of the 9 steviol glycosides. In another embodiment, the content of rebaudioside D may be 7 wt % to 28 wt %, 9 wt % to 26 wt %, 10 wt % to 25 wt %, 12 wt % to 23 wt %, 14 wt % to 21 wt %, 15 wt % to 20 wt %, 6 wt % to 20 wt %, 7 wt % to 18 wt % or 8 wt % to 16 wt %, and is preferably 6 wt % to 20 wt % based on the total content of the 9 steviol glycosides.

In an embodiment of the present invention, the sum of the ratio of rebaudioside A and the ratio of rebaudioside D is preferably 50 wt % to 90 wt % based on the total content of the 9 steviol glycosides. In another embodiment, the sum of the ratio of rebaudioside A and the ratio of rebaudioside D may be 55 wt % to 85 wt %, 60 wt % to 85 wt %, 65 wt % to 85 wt %, 70 wt % to 85 wt %, 75 wt % to 85 wt %, 65 wt % to 80 wt %, 70 wt % to 80 wt % or 75 wt % to 80 wt %, and is preferably 55 wt % to 80 wt % based on the total content of the 9 steviol glycosides.

In an embodiment of the present invention, the ratio of rebaudioside B to the total content of the 9 steviol glycosides may be 0.005 wt % to 3.0 wt %, 0.01 wt % to 3.0 wt %, 0.1 wt % to 2.0 wt %, 0.2 wt % to 1.8 wt %, 0.4 wt % to 1.6 wt %, 0.6 wt % to 1.4 wt %, 0.8 wt % to 1.2 wt %, or 0.2 wt % to 0.8 wt %, and is preferably 0.2 wt % to 0.8 wt %.

In an embodiment of the present invention, the ratio of rebaudioside C to the total content of the 9 steviol glycosides may be 3.0 wt % to 9.0 wt %, 3.5 wt % to 9.0 wt %, 4.0 wt % to 8.0 wt %, 4.5 wt % to 7.0 wt % or 5.0 wt % to 6.5 wt %, and is preferably 3.0 wt % to 6.5 wt %.

In an embodiment of the present invention, the ratio of rebaudioside F to the total content of the 9 steviol glycosides may be 0.5 wt % to 4.0 wt %, 1.0 wt % to 3.5 wt %, 1.5 wt % to 3.0 wt % or 0.5 wt % to 2.0 wt %, and is preferably 0.5 wt % to 2.0 wt %.

In an embodiment of the present invention, the ratio of dulcoside A to the total content of the 9 steviol glycosides may be 0.01 wt % to 0.50 wt %, 0.02 wt % to 0.45 wt %, 0.03 wt % to 0.40 wt % or 0.04 wt % to 0.35 wt %, and is preferably 0.04 wt % to 0.35 wt %.

In an embodiment of the present invention, the ratio of rubusoside to the total content of the 9 steviol glycosides may be 0.01 wt % to 0.50 wt %, 0.02 wt % to 0.45 wt %, 0.03 wt % to 0.40 wt % or 0.04 wt % to 0.35 wt %, and is preferably 0.04 wt % to 0.35 wt %.

In an embodiment of the present invention, the ratio of steviolbioside to the total content of the 9 steviol glycosides may be 0.001 wt % to 0.50 wt %, 0.005 wt % to 0.50 wt %, 0.01 wt % to 0.50 wt %, 0.05 wt % to 0.45 wt %, 0.08 wt % to 0.40 wt % or 0.10 wt % to 0.35 wt %, and is preferably 0.08 wt % to 0.35 wt %.

In an embodiment of the present invention, the ratio of stevioside to the total content of the 9 steviol glycosides may be 1.0 wt % to 35 wt %, 5.0 wt % to 30 wt %, 10 wt % to 30 wt %, 15 wt % to 30 wt %, 20 wt % to 30 wt %, 1 wt % to 20 wt %, 5 wt % to 20 wt % or 10 wt % to 25 wt %, and is preferably 10 wt % to 31 wt %.

The steviol glycoside composition of the present invention may also include a steviol glycoside other than the 9 steviol glycosides. For example, the steviol glycoside composition of the present invention may include, in addition to the above 9 steviol glycosides, one or more steviol glycosides selected from the group consisting of rebaudioside E, rebaudioside I, rebaudioside J, rebaudioside K, rebaudioside M, rebaudioside N, rebaudioside O, rebaudioside Q, rebaudioside R, dulcoside C, steviol and steviolmonoside.

In an embodiment of the present invention, the ratio of rebaudioside M to the total amount of the 9 steviol glycosides is 0.5 wt % to 10 wt %. In another embodiment, the content of rebaudioside M may be 1.0 wt % to 9.0 wt %, 1.5 wt % to 8.5 wt %, 2.0 wt % to 8.0 wt %, 2.5 wt % to 7.5 wt %, 3.0 wt % to 7.0 wt %, 4.0 wt % to 6.5 wt %, 1.0 wt % to 6.0 wt % or 1.5 wt % to 4.0 wt %, and is preferably 1.0 wt % to 5.0 wt % based on the total amount of the 9 steviol glycosides.

In an embodiment of the present invention, the ratio of rebaudioside N to the content of the 9 steviol glycosides may be 0.1 wt % to 6.0 wt %, 0.5 wt % to 5.5 wt %, 1.5 wt % to 5.0 wt % or 2.0 wt % to 5.0 wt %, and is preferably 1.5 wt % to 5.0 wt %.

Leaves of *Stevia* include various components in addition to steviol glycoside. In the present description, these components are referred to as a "component derived from *Stevia* other than steviol glycoside." When a steviol glycoside composition is prepared from *Stevia* extract, the component derived from *Stevia* other than steviol glycoside in the steviol glycoside composition is substantially derived from *Stevia*. Such components derived from *Stevia* other than steviol glycoside include a water-soluble component and an insoluble component. Examples of the water-soluble component include polysaccharides such as water-soluble dietary fiber, secondary metabolites such as alkaloid, flavonoid and terpenoid, methanol, polyphenol, mineral, vitamin, amino acid, organic acid, water-soluble protein and various other glycosides. Examples of the insoluble component include insoluble polysaccharides such as insoluble dietary fiber, insoluble protein and lipid.

In an embodiment of the present invention, the ratio of the steviol glycoside other than the 9 steviol glycosides and the component derived from *Stevia* other than steviol glycoside is 5 wt % to 40 wt % based on the total weight of solids of the steviol glycoside composition. In another embodiment, the ratio of the steviol glycoside other than the 9 steviol glycosides and the component derived from *Stevia* other than steviol glycoside may be 5 wt % to 35 wt %, 5 wt % to 30 wt %, 5 wt % to 25 wt %, 5 wt % to 20 wt %, 5 wt % to 15 wt %, 5 wt % to 10 wt %, 10 wt % to 35 wt %, 10 wt % to 30 wt %, 10 wt % to 25 wt % or 10 wt % to 20 wt %, and is preferably 5 wt % to 20 wt % based on the total weight of solids of the steviol glycoside composition.

In an embodiment of the present invention, the content of methanol is 0.10 wt % or less based on the amount of the 9 steviol glycosides in the composition. As used herein, "based on the amount of the 9 steviol glycosides in the composition" means that the amount of water, impurities and the like other than the 9 steviol glycosides in the composition (i.e., stevioside, rebaudioside A, rebaudioside B, rebaudioside C, rebaudioside D, rebaudioside F, dulcoside A, rubusoside and steviolbioside) is excluded. In other words, the content of methanol is relative to the amount of the 9 steviol glycosides. The content of methanol may be measured by a gas chromatography mass spectrometry (GC/MS). In another embodiment, the content of methanol is 0.09 wt % or less, 0.08 wt % or less, 0.07 wt % or less, 0.06 wt % or less, or 0.05 wt % or less based on the amount of the 9 steviol glycosides in the composition. The lower limit is preferably 0.01 wt %. Low content of methanol improves safety for taking.

In an embodiment of the present invention, the content of polyphenol is 2.0 wt % or less based on the amount of the 9 steviol glycosides in the composition. The content of polyphenol may be measured by the Folin-Ciocalteu method. In another embodiment, the content of polyphenol is 1.9 wt % or less, 1.8 wt % or less, 1.7 wt % or less, 1.6 wt % or less, 1.5 wt % or less, 1.4 wt % or less, 1.3 wt % or less, 1.2 wt % or less, 1.1 wt % or less, 1.0 wt % or less, 0.9 wt % or less, 0.8 wt % or less, 0.7 wt % or less, 0.6 wt % or less, or 0.5 wt % or less based on the amount of the 9 steviol glycosides in the composition. The lower limit is preferably 0.1 wt %. Low content of polyphenol can reduce bitterness, astringency and other off-flavors.

In an embodiment of the present invention, the total amount of nitrogen is 0.40 wt % or less based on the amount of the 9 steviol glycosides in the composition. The total amount of nitrogen may be measured by a combustion method. In another embodiment, the total amount of nitrogen is 0.35 wt % or less, 0.30 wt % or less, 0.25 wt % or less, 0.20 wt % or less, 0.15 wt % or less, 0.10 wt % or less, or 0.05 wt % or less based on the amount of the 9 steviol glycosides in the composition. The lower limit is preferably 0.01 wt %. A low total amount of nitrogen can reduce bitterness and other off-flavors.

The steviol glycoside according to the present invention may be used as a sweetener composition. When the steviol glycoside composition is used as a sweetener composition, the composition may include a sweetener other than steviol glycoside in addition to the steviol glycoside composition of the present invention. Examples of such sweeteners include natural sweeteners such as fructose, sugar, fructose glucose syrup, glucose, maltose, high fructose corn syrup, sugar alcohol, oligosaccharide, honey, sugarcane juice (brown sugar molasses), starch syrup, monk fruit powder, monk fruit extract, licorice powder, licorice extract, powder of seeds of *Thaumatococcus danielli* and extract of seeds of *Thaumatococcus danielli*, and artificial sweeteners such as acesulfame potassium, sucralose, neotame, aspartame and saccharin. Of them, natural sweeteners are preferably used because they give a refreshing taste, smoothness, a natural taste and a moderately rich flavor. Fructose, glucose, maltose, sucrose and sugar are particularly preferably used. One of these sweetener components may be used or a plurality of them may be used.

The steviol glycoside according to the present invention may be produced by extraction and purification from dry leaves of *Stevia* plant (described in detail in "3. Method for producing steviol glycoside composition from dry leaves of *Stevia* plant") or by adding and mixing a purified product. When the steviol glycoside composition of the present invention is produced by adding and mixing a purified product, the composition may be prepared by adding and mixing, for example, a high purity product (purity 95% or more) of rebaudioside A, rebaudioside D and rebaudioside M. Rebaudio J-100 (made by Morita Kagaku Kogyo Co., Ltd.) may be used as a high purity product of rebaudioside A. A high purity product of rebaudioside D may be prepared by the method disclosed in, for example, Japanese Patent Publication No. 5759998. The high purity product of rebaudioside M may be prepared by the method disclosed in, for example, Japanese Translation of PCT International Application Publication No. JP-T-2015-502404.

2. Food or Drink, Flavoring and Medicine Containing Steviol Glycoside Composition An aspect of the present invention provides a food or drink, a flavoring and a medicine containing the steviol glycoside composition of the present invention (in the present description, they are also referred to as "the food or drink of the present invention", "the flavoring of the present invention" and "the medicine of the present invention", respectively). The food or drink, flavoring and medicine of the present invention are not particularly limited as long as they contain the steviol glycoside composition of the present invention. The food or drink means a drink or food product, and in a preferred embodiment, the food or drink is a drink. Thus, an embodiment of the present invention provides a novel drink or food product, and provides a method for producing the drink or food product.

The amount of steviol glycoside composition of the present invention contained in the food or drink, flavoring and medicine of the present invention varies depending on the specific food or drink. In the case of drinks, the amount is basically preferably 1 ppm by mass to 800 ppm by mass, and may be, for example, 20 ppm by mass to 750 ppm by mass, 20 ppm by mass to 700 ppm by mass, 20 ppm by mass to 650 ppm by mass, 20 ppm by mass to 600 ppm by mass, 20 ppm by mass to 550 ppm by mass, 25 ppm by mass to 550 ppm by mass, 30 ppm by mass to 550 ppm by mass, 35 ppm by mass to 550 ppm by mass, 40 ppm by mass to 550 ppm by mass, 45 ppm by mass to 550 ppm by mass, 50 ppm by mass to 550 ppm by mass, 55 ppm by mass to 550 ppm by mass, 20 ppm by mass to 540 ppm by mass, 25 ppm by mass to 540 ppm by mass, 30 ppm by mass to 540 ppm by mass, 35 ppm by mass to 540 ppm by mass, 40 ppm by mass to 540 ppm by mass, 45 ppm by mass to 540 ppm by mass, 50 ppm by mass to 540 ppm by mass, 55 ppm by mass to 540 ppm by mass, 20 ppm by mass to 530 ppm by mass, 25 ppm by mass to 530 ppm by mass, 30 ppm by mass to 530 ppm by mass, 35 ppm by mass to 530 ppm by mass, 40 ppm by mass to 530 ppm by mass, 45 ppm by mass to 530 ppm by mass, 50 ppm by mass to 530 ppm by mass, 55 ppm by mass to 530 ppm by mass, 20 ppm by mass to 520 ppm by mass, 25 ppm by mass to 520 ppm by mass, 30 ppm by mass to 520 ppm by mass, 35 ppm by mass to 520 ppm by mass, 40 ppm by mass to 520 ppm by mass, 45 ppm by mass to 520 ppm by mass, 50 ppm by mass to 520 ppm by mass, 55 ppm by mass to 520 ppm by mass, 20 ppm by mass to 510 ppm by mass, 25 ppm by mass to 510 ppm by mass, 30 ppm by mass to 510 ppm by mass, 35 ppm by mass to 510 ppm by mass, 40 ppm by mass to 510 ppm by mass, 45 ppm by mass to 510 ppm by mass, 50 ppm by mass to 510 ppm by mass, 55 ppm by mass to 510 ppm by mass, 20 ppm by mass to 505 ppm by mass, 25 ppm by mass to 505 ppm by mass, 30 ppm by mass to 505 ppm by mass, 35 ppm by mass to 505 ppm by mass, 40 ppm by mass to 505 ppm by mass, 45 ppm by mass to 505 ppm by mass, 50 ppm by mass to 505 ppm by mass, 55 ppm by mass to 505 ppm by mass, 20 ppm by mass to 500 ppm by mass, 25 ppm by mass to 500 ppm by mass, 30 ppm by mass to 500 ppm by mass, 35 ppm by mass to 500 ppm by mass, 40 ppm by mass to 500 ppm by mass, 45 ppm by mass to 500 ppm by mass, 50 ppm by mass to 500 ppm by mass, 55 ppm by mass to 500 ppm by mass, 20 ppm by mass to 495 ppm by mass, 25 ppm by mass to 495 ppm by mass, 30 ppm by mass to 495 ppm by mass, 35 ppm by mass to 495 ppm by mass, 40 ppm by mass to 495 ppm by mass, 45 ppm by mass to 495 ppm by mass, 50 ppm by mass to 495 ppm by mass, 55 ppm by mass to 495 ppm by mass, 20 ppm by mass to 490 ppm by mass, 25 ppm by mass to 490 ppm by mass, 30 ppm by mass to 490 ppm by mass, 35 ppm by mass to 490 ppm by mass, 40 ppm by mass to 490 ppm by mass, 45 ppm by mass to 490 ppm by mass, 50 ppm by mass to 490 ppm by mass, 55 ppm by mass to 490 ppm by mass, 100 ppm by mass to 400 ppm by mass, 150 ppm by mass to 400 ppm by mass, 200 ppm by mass to 400 ppm by mass, 250 ppm by mass to 400 ppm by mass, 300 ppm by mass to 400 ppm by mass, 100 ppm by mass to 150 ppm by mass, 100 ppm by mass to 200 ppm by mass, 100 ppm by mass to 250 ppm by mass or 100 ppm by mass to 300 ppm by mass. When the content is in the above range, the advantage is that a moderate sweetness is given. In the present description, "ppm" means "ppm by mass" unless otherwise specified.

The food or drink, flavoring and medicine of the present invention may further contain other steviol glycosides. The food or drink, flavoring and medicine of the present invention may also contain, for example, one or more steviol glycosides selected from the group consisting of rebaudioside A, rebaudioside B, rebaudioside C, rebaudioside D, rebaudioside E, rebaudioside F, rebaudioside I, rebaudioside J, rebaudioside K, rebaudioside N, rebaudioside M, rebaudioside O, rebaudioside Q, rebaudioside R, dulcoside A, dulcoside C, rubusoside, steviol and steviolmonoside, steviolbioside in addition to the steviol glycoside composition of the present invention.

The food or drink, flavoring and medicine of the present invention may also contain a sweetener other than the steviol glycoside. Examples of such sweeteners include natural sweeteners such as fructose, sugar, fructose glucose syrup, glucose, maltose, sucrose, high fructose corn syrup, sugar alcohol, oligosaccharide, honey, sugarcane juice (brown sugar molasses), starch syrup, monk fruit powder, monk fruit extract, licorice powder, licorice extract, powder of seeds of *Thaumatococcus danielli* and extract of seeds of *Thaumatococcus danielli*, and artificial sweeteners such as acesulfame potassium, sucralose, neotame, aspartame and saccharin. Of them, natural sweeteners are preferably used because they give a refreshing taste, smoothness, a natural taste and a moderately rich flavor. Fructose, glucose, maltose, sucrose and sugar are particularly preferably used. One of these sweetener components may be used or a plurality of them may be used.

For the content of the sweetener other than the steviol glycoside, the ratio of the composition of the steviol glycoside composition of the present invention to the sweetener other than the steviol glycoside may be, in the weight ratio, 1:99 to 99:1, 5:99 to 95:5, 10:90 to 90:10, 15:85 to 85:15, 20:80 to 80:20, 25:75 to 75:25, 30:70 to 70:30, 35:65 to 65:35, 40:60 to 60:40, 45:65 to 65:45 or 50:50 in the case of a high intensity sweetener (e.g. mogroside V, xylitol and artificial sweetener). When the steviol glycoside composition of the present invention contains a low intensity sweetener (e.g. sucrose and fructose glucose syrup), the ratio of the composition of the steviol glycoside composition of the present invention to the low intensity sweetener may be, in the weight ratio, 1:1,000 to 1:100, 1:800 to 1:100, 1:700 to 1:100, 1:600 to 1:100, 1:500 to 1:100, 1:400 to 1:100, 1:300 to 1:100 or 1:200 to 1:100.

Examples of the food product according to the present invention include, but not limited to, confectionery, bread, flour, noodles, rice, processed agricultural/forest products, processed livestock products, processed fishery products, milk and dairy products, oil and fat and processed oil and fat products, seasoning and other food materials.

Examples of the drink according to the present invention include, but not limited to, carbonated drinks, non-carbonated drinks, alcoholic drinks, non-alcoholic drink, beer and beer-like drinks such as non-alcoholic beer, coffee drinks, tea drinks, cocoa drinks, energy drinks and functional drinks.

The drink of the present invention may be a packed drink heat sterilized and packed in a container. The container is not particularly limited, and examples thereof include plastic bottles, aluminum cans, steel cans, paper containers, chilled cups and bottles. When heat sterilization is performed, the type of heat sterilization is not particularly limited, and for example, a usual process such as UHT sterilization and retort sterilization may be used. The temperature in the process of heat sterilization is not particularly limited, and is, for example 65 to 130° C., preferably 85 to 120° C., for 10 to 40 minutes. Sterilization at an appropriate temperature for several seconds, for example, 5 to 30 seconds may be performed as long as the sterilization value is equal to that under the above condition.

The method for producing the food or drink, flavoring and medicine of the present invention is not particularly limited as long as the food or drink, flavoring and medicine containing the above component is obtained. An embodiment of the present invention provides a method for producing the food or drink, flavoring and medicine of the present invention, comprising a step for preparing the steviol glycoside composition of the present invention and a step for adding the steviol glycoside composition to a food or drink, a flavoring and a medicine or a raw material thereof. The step for preparing the steviol glycoside composition according to the present invention is as described in "3. Method for producing steviol glycoside composition from dry leaves of *Stevia* plant." The step for adding the steviol glycoside composition of the present invention to a food or drink, a flavoring and a medicine or a raw material thereof may be performed at any stage in the method for producing food or drink, a flavoring and a medicine. For example, the step may be performed when mixing raw materials of the food or drink, flavoring and medicine or when finally adjusting the taste of the food or drink, flavoring and medicine.

3. Method for Producing Steviol Glycoside Composition from Dry Leaves of *Stevia* Plant An aspect of the present invention provides a method for producing a steviol glycoside composition from dry leaves of *Stevia* plant (also referred to as "the production method of present invention" in the present description). The production method of the present invention comprises performing extraction of the dry leaf using a solvent to obtain an extract; subjecting the extract to solid-liquid separation treatment to obtain a clear liquid; adding a coagulant to the clear liquid to coagulate the liquid to obtain a processed liquid; treating the processed liquid with a hydrophobic porous resin; and eluting a steviol glycoside from the porous resin using a solvent. The production method of the present invention can provide a steviol glycoside composition in which the content of 9 steviol glycosides of stevioside, rebaudioside A, rebaudioside B, rebaudioside C, rebaudioside D, rebaudioside F, dulcoside A, rubusoside and steviolbioside is 60 wt % or more and less than 95 wt % based on the total weight of the steviol glycoside composition; and the content of a steviol glycoside other than the 9 steviol glycosides and a component derived from *Stevia* other than steviol glycosides is 5 wt % to 40 wt %. The respective steps will be described in below.

(A) Extraction from Dry Leaves of *Stevia* Plant

The production method according to an embodiment of the present invention includes performing extraction of dry leaves of *Stevia* plant using an aqueous solvent to obtain an extract (extract solution). In the present description, the dry leaf of *Stevia* plant is those whose moisture content has been reduced by drying fresh leaves of *Stevia* plant. The water content of the dry leaf of *Stevia* plant is preferably 1 to 10 wt %, more preferably 2 to 8 wt %, and particularly preferably 3 to 4 wt %. The dry leaf of *Stevia* plant is not particularly limited as long as the leaf includes steviol glycoside. Those whose content of, preferably, rebaudioside D or rebaudioside M is higher than that of dry leaves of natural *Stevia* plant are preferred. Such dry leaves of *Stevia* plant may be prepared by the method disclosed in, for example, International Publication No. 2019/074089.

The dry leaf of *Stevia* plant preferably used in the production method of the present invention contains 5.0 to 25 g of steviol glycoside in 100 g of the dry leaf when the moisture content is 3 to 4 wt %. The dry leaf in another embodiment may contain 6.0 to 24 g, 7.0 to 23 g, 8.0 to 22 g, 9.0 to 21 g, 10 to 20 g or 11 to 19 g of steviol glycoside in 100 g of the dry leaf when the moisture content is 3 to 4 wt %.

The dry leaf preferably used in the production method of the present invention contains 0.5 g or more of rebaudioside D in 100 g of the dry leaf when the moisture content is 3 to 4 wt %. Furthermore, the dry leaf preferably used in another embodiment contains 0.19 g or more of rebaudioside M in 100 g of the dry leaf when the moisture content is 3 to 4 wt %. Furthermore, the dry leaf preferably used in another embodiment contains 3.0 g or more of rebaudioside A in 100 g of the dry leaf when the moisture content is 3 to 4 wt %. In another preferred embodiment, the dry leaf may contain rebaudioside D in an amount of 1.0 g or more, 1.1 g or more, 1.2 g or more, 1.3 g or more, 1.4 g or more, 1.5 g or more, 1.6 g or more, 1.7 g or more, 1.8 g or more, 1.9 g or more, 2.0 g or more, 2.1 g or more, 2.2 g or more, 2.3 g or more, 2.4 g or more, 2.5 g or more, 2.6 g or more, 2.7 g or more, 2.8 g or more, 2.9 g or more, 3.0 g or more, 3.1 g or more, 3.2 g or more, 3.3 g or more, 3.4 g or more, 3.5 g or more, 3.6 g or more, 3.7 g or more, 3.8 g or more, 3.9 g or more, 4.0 g or more, 4.1 g or more or 4.2 g or more, and for example, 6.0 g or less, 5.5 g or less or 5.0 g or less in 100 g of the dry leaf when the moisture content is 3 to 4 wt %. In another preferred embodiment, the dry leaf may contain rebaudioside M in an amount of 0.20 g or more, 0.25 g or more, 0.30 g or more, 0.35 g or more, 0.40 g or more, 0.45 g or more, 0.50 g or more, 0.55 g or more, 0.60 g or more, 0.65 g or more, 0.70 g or more, 0.75 g or more, 0.80 g or more, 0.85 g or more, 0.90 g or more, 0.95 g or more, 1.00 g or more, 1.05 g or more, 1.10 g or more, 1.15 g or more, 1.20 g or more, 1.25 g or more, 1.30 g or more, 1.35 g or more, 1.40 g or more, 1.45 g or more, and for example, 1.50 g or less, 1.30 g or less or 1.20 g or less in 100 g of the dry leaf when the moisture content is 3 to 4 wt %. In another preferred embodiment, the dry leaf may contain rebaudioside A in an amount of 3.0 g or more, 3.5 g or more, 4.0 g or more, 4.5 g or more, 5.0 g or more, 5.5 g or more, 6.0 g or more, 6.5 g or more, 7.0 g or more, 7.5 g or more, 8.0 g or more, 8.5 g or more, 9.0 g or more, 9.5 g or more, 10 g or more, 11 g or more, 12 g or more, 13 g or more, or 14 g or more, and for example, 17 g or less, 16 g or less or 15 g or less in 100 g of the dry leaf when the moisture content is 3 to 4 wt %.

The dry leaf used in an embodiment of the production method of the present invention contains 35 wt % to 75 wt % of rebaudioside A based on the content of all steviol glycosides. In the present description, "all steviol glycosides" do not include unknown steviol glycosides or steviol glycosides present in an amount less than the limit of detection. Preferably "all steviol glycosides" consist of rebaudioside A, rebaudioside B, rebaudioside C, rebaudioside D, rebaudioside E, rebaudioside F, rebaudioside G, rebaudioside I, rebaudioside M, rebaudioside N, stevioside, dulcoside A, steviolbioside and rubusoside. In another embodiment, the ratio of rebaudioside A may be 37 wt % to 73 wt %, 39 wt % to 71 wt %, 40 wt % to 70 wt %, 42 wt % to 68 wt %, 44 wt % to 66 wt %, 46 wt % to 64 wt %, 48 wt % to 62 wt %, 50 wt % to 60 wt %, 35 wt % to 65 wt % or 37 wt % to 63 wt %, and is preferably 35 wt % to 65 wt % based on the content of all steviol glycosides.

The dry leaf used in an embodiment of the production method of the present invention contains 5 wt % to 30 wt % of rebaudioside D based on the content of all steviol glycosides. In another embodiment, the content of rebaudioside D may be 7 wt % to 28 wt %, 9 wt % to 26 wt %, 10 wt % to 25 wt %, 12 wt % to 23 wt %, 14 wt % to 21 wt %, 15 wt % to 20 wt %, 6 wt % to 20 wt %, 7 wt % to 18 wt % or 8 wt % to 16 wt %, and is preferably 6 wt % to 20 wt % based on the content of all steviol glycosides.

The dry leaf used in an embodiment of the production method of the present invention contains 0.5 wt % to 15 wt % of rebaudioside M based on the content of all steviol glycosides. In another embodiment, the content of rebaudioside D may be 1.0 wt % to 13 wt %, 1.5 wt % to 11 wt %, 2.0 wt % to 10 wt %, 2.5 wt % to 9.0 wt %, 3.0 wt % to 8.0 wt %, 4.0 wt % to 7.0 wt %, 1.0 wt % to 5.0 wt %, or 1.5 wt % to 4.0 wt %, and is preferably 1.0 wt % to 6.0 wt % based on the content of all steviol glycosides.

Steviol glycoside may be extracted from dry leaves using a solvent such as water, alcohol, or a mixed solution thereof. Examples of preferred extraction solvents include ion exchange water, pure water (e.g., Milli-Q water) and aqueous ethanol solution. When performing extraction, dry leaves may be crushed or may not be crushed. When crushed, dry leaves may be crushed by using, for example, a ball mill. Alternatively, extraction may be performed using a kneader extractor (SKN-R100 made by SANYUKIKI Co., Ltd.) or the like.

In extraction, steviol glycoside can be extracted more efficiently by heating the aqueous solvent. The temperature in extraction may be, for example, 25 to 80° C., 30 to 75° C., 35 to 70° C., 40 to 65° C., or 45 to 70° C., and is preferably 45 to 70° C.

Extraction may be performed not only once but also several times. Steviol glycoside contained in the leaves can be extracted in larger amounts by performing extraction several times. It is preferable to perform extraction about twice in consideration of efficiency.

(B) Solid-Liquid Separation Treatment

In the production method according to an embodiment of the present invention, the extract obtained may be subjected to a solid-liquid separation treatment to obtain a clear liquid. The solid-liquid separation treatment is not particularly limited as long as the extract is thoroughly separated into solid and liquid. Examples thereof include treatment using a centrifugal separator or a filter press, and gravity filtration using a filter or a mesh.

A plurality of approaches may be used in the solid-liquid separation treatment. For example, the first solid-liquid separation treatment may be performed and then the second solid-liquid separation treatment may be performed to give a clear liquid.

(C) Coagulation Treatment

In the production method according to an embodiment of the present invention, a processed liquid may be prepared by adding a coagulant to the clear liquid prepared by the solid-liquid separation treatment. The coagulant is not particularly limited, and a known inorganic coagulant and organic polymer coagulant may be used. In another embodiment of the present invention, the coagulant includes one or more selected from aluminum sulfate, aluminum polychloride, iron (III) chloride or a hydrate thereof, synthetic polymer coagulant (e.g., polyacrylamide polymer, partial hydrolysate of polyacrylamide), alginic acid, chitin, chitosan and calcium hydroxide. In an embodiment of the present invention, one or more of these coagulants may be included as a coagulant, or another coagulant may be further included. Two or more coagulants may be used in combination. For example, calcium hydroxide and iron chloride, or calcium hydroxide, iron chloride and chitosan may be used in combination.

The amount of the coagulant to be added is not particularly limited as long as coagulation is caused by the coagulant. For example, 3.0 to 50 wt % of coagulant may be added based on the amount of soluble solids in the clear liquid. For example, 10 to 30 wt %, preferably 12 to 28 wt %, and more preferably 14 to 25 wt % of calcium hydroxide may be added thereto based on the amount of solids in the clear liquid. 15 to 40 wt %, preferably 18 to 38 wt %, and more preferably 20 to 35 wt % of iron (III) chloride hexahydrate may be added thereto based on the amount of solids in the clear liquid. 3.0 to 10 wt %, preferably 4.0 to 8.0 wt %, and more preferably 4.5 to 7.0 wt % of a 0.5% (w/v) chitosan solution may be added thereto based on the amount of solids in the clear liquid.

The pH in the coagulation treatment is not particularly limited, and may be selected so that coagulation is optimized depending on the type of the coagulant. In an embodiment of the present invention, the pH of the clear liquid in the coagulation treatment may be 2.0 to 13, 3.0 to 13, 4.0 to 13, 5.0 to 13 or 6.0 to 13.

The temperature in the coagulation treatment is not particularly limited, and it may be performed at room temperature (about 25° C.) without heating or cooling.

In an embodiment of the present invention, after the coagulation treatment, coagulant in the processed liquid may be removed before the treatment of purification with resin described later. The coagulant may be removed by an optional method such as filtration.

(D) Treatment of Purification with Resin

In the production method according to an embodiment of the present invention, the processed liquid obtained in the coagulation treatment is treated with a hydrophobic porous resin. Steviol glycoside is amphipathic with a hydrophilic group and a hydrophobic group in the molecular structure, and has a molecular weight of about 1,000. Furthermore, steviol glycoside is known to be stable at pH 2.5 to 9.0 and not ionized under an acidic or basic condition. Meanwhile, the processed liquid after the coagulation treatment also includes a large amount of components other than steviol glycoside. While it is not bound by any theory, these components include iron, which has a molecular weight different from that of steviol glycoside, and amino acid, which is ionized. They may be removed by treatment with a hydrophobic porous resin.

Steviol glycoside having a hydrophobic steviol skeleton is hydrophobically bonded to synthetic resin and is captured. Meanwhile, highly hydrophilic impurities are not bonded to the resin and transferred to the through fraction to be removed. Thus, the purity of steviol glycoside is considered to be improved by introducing the processed liquid after the coagulation treatment into the column packed with the above resin and then washing with water. Furthermore, the bond between steviol glycoside and the functional group in synthetic resin is dissociated with low polar solvent, and the advantage is that steviol glycoside can be finally collected at high yield.

The hydrophobic porous resin used in the production method according to an embodiment of the present invention is not particularly limited as long as the porous resin has low affinity to water. For example, one or more hydrophobic porous resins selected from a copolymer of styrene and divinyl benzene, polyethylene, polypropylene, polystyrene, poly(meth)acrylonitrile, polyamide and polycarbonate are preferred. In a preferred embodiment of the present invention, no ion exchange group has been introduced into the copolymer of styrene and divinyl benzene (in other words, the copolymer does not have an ion exchange group). Usually, when an ion exchange resin is produced, styrene and divinyl benzene are copolymerized to form a three-dimensional network structure, and then an ion exchange group is introduced into the resin. "No ion exchange group has been introduced into the copolymer" means that such treatment has not been done.

In an embodiment of the present invention, the hydrophobic porous resin has a hydrophobic group, and the hydrophobic group includes one or more selected from an aryl group, an alkyl group, an alkylsilyl group, an ester group and an epoxy group. In an embodiment of the present invention, as long as the hydrophobic porous resin includes one or more hydrophobic group selected therefrom, the resin may also include other hydrophobic groups. Examples of the aryl group include a phenyl group, a benzyl group, a tolyl group and a xylyl group. Examples of the alkyl group include C1 to 20 alkyl groups, e.g., a methyl group, an ethyl group, a propyl group, a butyl group, a pentyl group and an octadecyl group.

In a preferred embodiment of the present invention, the hydrophobic porous resin has a modal pore size of 10 to 200 Å. In a preferred embodiment, the hydrophobic porous resin has a modal pore size of 10 to 150 Å, 15 to 100 Å, or 20 to 80 Å. These characteristics of the pore are considered to allow steviol glycoside to be efficiently adsorbed on the pore and efficiently separated from other components.

Before treating with a hydrophobic porous resin, the processed liquid may also be treated with an anion exchange resin. By previously treating with an anion exchange resin, components bonded to the hydrophobic resin, such as coloring and catechin, can be effectively removed. Such an anion exchange resin is not particularly limited, and examples thereof include basic anion exchange resins. A weakly basic anion exchange resin into which a primary or secondary amino group has been introduced as a functional group or a strongly basic anion exchange resin having a tetraammonium group (e.g., trimethyl ammonium group and dimethyl ethanol ammonium group) may be used.

(E) Treatment of Concentration

The solution after the treatment of purification with resin may be subjected to a treatment of concentration to remove aqueous solvent. This treatment is not particularly limited, and examples thereof include evaporation of aqueous solvent by heating and removal of aqueous solvent by drying under reduced pressure.

The production method of the present invention provides a steviol glycoside composition in which the content of the above 9 steviol glycosides is 60 wt % or more and less than 95 wt % based on the total weight of the solid of the steviol glycoside composition; and the total content of a steviol glycoside other than the above 9 steviol glycosides and a component derived from *Stevia* other than steviol glycosides is 5 wt % to 40 wt %. Furthermore, the production method according to a preferred embodiment of the present invention provides a steviol glycoside composition which has at least one selected from the following properties:

the content of methanol is 0.10 wt % or less based on an amount of the 9 steviol glycosides in the composition;

the content of polyphenol is 2.0 wt % or less based on the amount of the 9 steviol glycosides in the composition; and the total amount of nitrogen is 0.40 wt % or less based on the amount of the 9 steviol glycosides in the composition.

(F) Optional Additional Steps

A high purity formulation (purity 95% or more) of rebaudioside A, rebaudioside D or rebaudioside M may be produced by adding a step of crystallization after the production method of the present invention.

EXAMPLES

Hereinafter the present invention will be described in more detail with reference to Examples, but the present invention is not limited thereto.

1. Extraction and Solid-Liquid Separation Treatment

Ion exchange water in an amount 15 times the amount of Stevia dry leaves (moisture content: 3 to 4 wt %) was heated to 60° C.±5° C. and the Stevia dry leaves were dipped in the ion exchange water. Then, extraction was performed for 60 minutes with stirring at 8 rpm using a stirring bar in a kneader extractor (SKN-R100 made by SANYUKIKI Co., Ltd.). Next, the solution was filtered through an 18-mesh or 140-mesh screen, and cooled in a heat exchanger using cold water. The filtrate was subjected to a solid-liquid separation treatment using a disc-type centrifugal separator (9150 rpm (11601 G), 24 L/min) to give the first extract. In the meantime, the leaves after filtration was extracted again under the same condition, and subjected to a solid-liquid separation treatment to give a transparent second extract, and the second extract was added to the first extract.

The content of steviol glycosides in the dry leaves used in the two tests (Example 1 and Example 2) was as described in the following table. The content of steviol glycosides in the dry leaves was measured by liquid chromatography mass spectrometry (LC/MS/MS). In the following table, TSG includes Reb. A, Reb. B, Reb. C, Reb. D, Reb. E, Reb. F, Reb. G, Reb. I, Reb. M, Reb. N, stevioside, dulcoside A, steviolbioside and rubusoside. The content of TSG in the dry leaves used in Example 1 and Example 2 was 7.05 g and 7.42 g per 100 g, respectively.

TABLE 1

| Content of steviol glycoside in dry leaves (%) | | | | | | | | |
|---|---|---|---|---|---|---|---|---|
| | Reb A | Reb B | Reb C | Reb D | Stevioside | Reb F | Reb M | Reb N | TSG |
| Example 1 | 58.7 | 0.9 | 4.5 | 10.1 | 13.5 | 1.3 | 3.8 | 2.0 | 100 |
| Example 2 | 37.4 | 1.8 | 4.3 | 18.8 | 20.3 | 1.1 | 5.8 | 5.7 | 100 |

2. Coagulation $Ca(OH)_2$ in an amount equivalent to 16.16% of the soluble solids in the clear liquid (calculated based on Brix (soluble solids concentration)) was added to the clear liquid, and the resulting mixture was stirred for 15 minutes. Subsequently, $FeCl_3 \cdot 6H_2O$ in an amount equivalent to 28.28% of the soluble solids in the clear liquid was added thereto, and the mixture was stirred for 30 minutes. After adjusting the pH to 7 with citric acid, a 0.5% (w/v) chitosan solution in a volume (mL) equivalent to 5.63 times the soluble solids (g) in the clear liquid was added thereto. The mixture was vigorously stirred for 3 minutes and softly stirred for 2 minutes, and left for 10 minutes. Then the coagulated precipitate, which was electrically neutral, was removed by centrifugal separation. As a result, a clear processed liquid was obtained.

3. Purification with Resin

For the purification with resin, the processed liquid was purified with (i) an anion exchange resin and (ii) a hydrophobic porous resin (into which no ion exchange group had been introduced).

(i) Purification Using Anion Exchange Resin

A column was packed with a highly porous basic anion exchange resin (made by Mitsubishi Chemical Corporation), and the processed liquid after coagulation separation was introduced into the column to purify the liquid. Following the introduction of the processed liquid after coagulation separation into the column, the processed liquid was extruded therethrough with ion exchange water in an amount twice as much as the capacity of the column to collect a solution containing a purified steviol glycoside composition. This purification removed black impurities and colored components in the processed liquid.

(ii) Purification Using Hydrophobic Porous Resin

A column was packed with a hydrophobic porous resin (made by Mitsubishi Chemical Corporation), and the sample after purification using the anion exchange resin (i) was introduced into the column to perform purification. A copolymer of styrene and divinyl benzene, which did not have an ion exchange group and had a modal pore size of 45 Å, was used as the hydrophobic porous resin. The liquid after the above purification (i) was introduced into the column, and then the column was washed with a 0.01 M aqueous solution of citric acid in an amount 3 times the capacity of the column and a 0.01 M aqueous solution of sodium hydroxide in an amount 3 times the capacity of the column. Subsequently, the steviol glycoside composition was eluted with a 60% ethanol aqueous solution in an amount 4 times the capacity of the column and collected.

4. Evaporative Concentration

The liquid was subjected to evaporative concentration using Centrifugal Thin-film Vacuum Evaporator EVAPOR (made by OKAWARA MFG. CO., LTD.) to remove ethanol. The resulting composition was in the form of liquid with water remaining even after the evaporative concentration.

Details of the steviol glycoside compositions finally obtained are shown in Tables 2 and 3. The total concentration of the 9 steviol glycosides (g/L) means the total concentration of the 9 steviol glycosides of stevioside, rebaudioside A, rebaudioside B, rebaudioside C, rebaudioside D, rebaudioside F, dulcoside A, rubusoside and steviolbioside in the steviol glycoside composition including liquid. The total purity of the 9 steviol glycosides (%) means the content ratio of the 9 steviol glycosides in terms of weight based on the total weight of solids in the steviol glycoside composition. The content of the respective steviol glycosides was determined by liquid chromatography mass spectrometry (LC/MS/MS) using LCMS-8050 (made by Shimadzu Corporation). The content of methanol was measured by a gas chromatography mass spectrometry (GC/MS). The content of polyphenol was measured by the Folin-Ciocalteu method. The total amount of nitrogen (T-N) was measured by a combustion method. "After ion exchange treatment" in Table 3 describes the results of measurement of the samples after the purification using the anion exchange resin (i). "After evaporative concentration" describes the results of measurement of the samples which were subjected to the evaporative concentration after the purification with the hydrophobic porous resin (ii). Furthermore, the content of methanol (MeOH (ppm)) described as "ND" in Table 3 means that the content was too small to be accurately calculated due to the setting of the measurement apparatus and the value was less than 2.5 ppm. When the concentration of the steviol glycosides in the samples of Example 1 and Example 2 after the evaporative concentration was measured by the HPLC method according to JECFA (2010), the purity of the 9 steviol glycoside was 81.0% and 76.1%, respectively.

to prepare a sample drink. The final total content of Reb. A, Reb. B, Reb. C, Reb. D, Reb. E, Reb. F, Reb. G, Reb. I, Reb. M, Reb. N, stevioside, dulcoside A, steviolbioside and rubusoside in the sample drink was adjusted to 300 ppm.

The sensory evaluation was performed for the indicators: the intensity of sweetness, lingering sweetness, bitterness, lingering bitterness and off-flavors. Five panelists who had been trained for sensory evaluation of sweeteners evaluated the compositions. The criteria of evaluation are as follows. For each item of evaluation, the steviol glycoside compositions were scored in increments of 0.5 point with the score of the sample containing Reb. D as the main component at high concentration as 0 (Reb. D purity: about 83%, Reb. A content: about 8%, balance: components derived from *Stevia* other than steviol glycoside), setting the lower limit as −3

TABLE 2

Composition of steviol glycoside composition

| | Ratio of glycoside (%) | | | | | | | | | Other components (%) |
| --- | --- | --- | --- | --- | --- | --- | --- | --- | --- | --- |
| | RebA | RebB | RebC | RebD | Stevioside | RebF | Dulcoside A | Rubusoside | Steviolbioside | Total of 9 steviol glycosides | Reb M/Sum of 9 steviol glycosides |
| Example 1 | 65.5 | 0.48 | 5.6 | 9.3 | 17.4 | 1.4 | 0.10 | 0.14 | 0.12 | 100 | 3.2 |
| Example 2 | 45.3 | 0.43 | 6.0 | 16.2 | 30.1 | 1.3 | 0.31 | 0.19 | 0.11 | 100 | 4.1 |

TABLE 3

Content of impurities in steviol glycoside composition

| | Total concentration of 9 steviol glycosides (g/L) | | Total purity of 9 steviol glycosides (%) | | Density (g/mL) | | MeOH/total of 9 steviol glycosides (%) | |
| --- | --- | --- | --- | --- | --- | --- | --- | --- |
| | Example 1 | Example 2 | Example 1 | Example 2 | Example 1 | Example 2 | Example 1 | Example 2 |
| After extraction and solid-liquid separation | 1.9 | 1.9 | 21.6 | 22.1 | 1 | 1 | 0.27 | <0.13 |
| After coagulation and precipitation | 2.1 | 2.4 | 26.5 | 37.7 | 1 | 1 | 0.24 | 0.12 |
| After ion exchange treatment | 2.0 | 2.1 | 27.4 | 35.6 | 1 | 1 | 0.24 | 0.12 |
| After evaporative concentration | 34.2 | 42.4 | 88.0 | 83.3 | 1.009 | 1.013 | <0.01 | <0.01 |

| | Polyphenol/total of 9 steviol glycosides (%) | | T-N/total of 9 steviol glycosides (%) | | MeOH (ppm) | | Polyphenol (g/100 g) | | T-N (g/100 g) | |
| --- | --- | --- | --- | --- | --- | --- | --- | --- | --- | --- |
| | Example 1 | Example 2 | Example 1 | Example 2 | Example 1 | Example 2 | Example 1 | Example 2 | Example 1 | Example 2 |
| After extraction and solid-liquid separation | 74.49 | 97.01 | 6.38 | 4.31 | 5.0 | ND | 0.140 | 0.180 | 0.012 | 0.008 |
| After coagulation and precipitation | 4.83 | 4.11 | 3.86 | 1.23 | 4.9 | 2.8 | 0.010 | 0.010 | 0.008 | 0.003 |
| After ion exchange treatment | 2.96 | 3.04 | 3.45 | 0.47 | 4.9 | 2.6 | 0.006 | 0.007 | 0.007 | 0.001 |
| After evaporative concentration | 0.59 | 0.11 | 0.24 | 0.07 | ND | ND | 0.020 | 0.005 | 0.008 | 0.003 |

In the table, "ND" means "not detected." More specifically, the samples whose content of methanol (MeOH (ppm)) is described as "ND" means that the content was too small to be accurately calculated due to the setting of the measurement apparatus and the value was less than 2.5 ppm. For the samples whose content of methanol (MeOH (ppm)) is described as "ND", the value of "MeOH/total of 9 steviol glycosides" was calculated on the assumption that the content of methanol was less than 2.5 ppm.

Sensory Evaluation of Steviol Glycoside Composition (Example 1)

For the evaluation of the taste of the steviol glycoside composition, the steviol glycoside composition of Example 1 prepared in the above Examples was added to pure water and the upper limit as 3. The higher value indicates that the composition has high intensity of sweetness, little lingering sweetness, little bitterness, little lingering bitterness and reduced off-flavors. The results are shown in FIG. 1. The scores in the figure show the average of the scores of the 5 panelists. Although the steviol glycoside composition of Example 1 has high ratio of Reb. A, the composition has good taste similar to that of the sample containing Reb. D at high concentration.

The invention claimed is:

1. A steviol glycoside composition, wherein
a total content of 9 steviol glycosides of stevioside, rebaudioside A, rebaudioside B, rebaudioside C, rebaudioside D, rebaudioside F, dulcoside A, rubusoside and steviolbioside is 60 wt % or more and less than 95 wt % based on a total weight of solids of the steviol glycoside composition; and
a total content of a steviol glycoside other than the 9 steviol glycosides and a component derived from *Stevia* other than steviol glycosides is 5 wt % to 40 wt %;
a ratio of a content of rebaudioside A to the total content of the 9 steviol glycosides on a weight basis is 35 wt % to 75 wt %, and a ratio of a content of rebaudioside D to the total content of the 9 steviol glycosides on a weight basis is 5 wt % to 30 wt %; and
wherein the composition has at least one selected from the following properties:
a content of methanol is 0.10 wt % or less based on an amount of the 9 steviol glycosides in the composition;
a content of polyphenol is 2.0 wt % or less based on the amount of the 9 steviol glycosides in the composition; and
a total amount of nitrogen is 0.40 wt % or less based on the amount of the 9 steviol glycosides in the composition.

2. The composition according to claim 1, wherein the composition is *Stevia* extract.

3. The composition according to claim 1, wherein a ratio of rebaudioside B is 0.005 to 3.0 wt %, a ratio of rebaudioside C is 3.0 to 9.0 wt %, a ratio of rebaudioside F is 0.5 to 4.0 wt %, a ratio of dulcoside A is 0.01 to 0.50 wt %, a ratio of rubusoside is 0.01 to 0.50 wt %, a ratio of steviolbioside is 0.001 to 0.50 wt %, and a ratio of stevioside is 1.0 to 35 wt % based on the content of the 9 steviol glycosides.

4. The composition according to claim 1, further comprising one or more steviol glycosides selected from the group consisting of rebaudioside E, rebaudioside I, rebaudioside J, rebaudioside K, rebaudioside M, rebaudioside N, rebaudioside O, rebaudioside Q, rebaudioside R, dulcoside C, steviol and steviolmonoside.

5. The composition according to claim 1, further comprising 0.5 wt % to 9.0 wt % of rebaudioside M based on the total amount of the 9 steviol glycoside.

6. A food or drink comprising the composition according to claim 1.

7. The food or drink according to claim 6, wherein the food or drink is a drink.

* * * * *